United States Patent Office 3,525,857
Patented Aug. 25, 1970

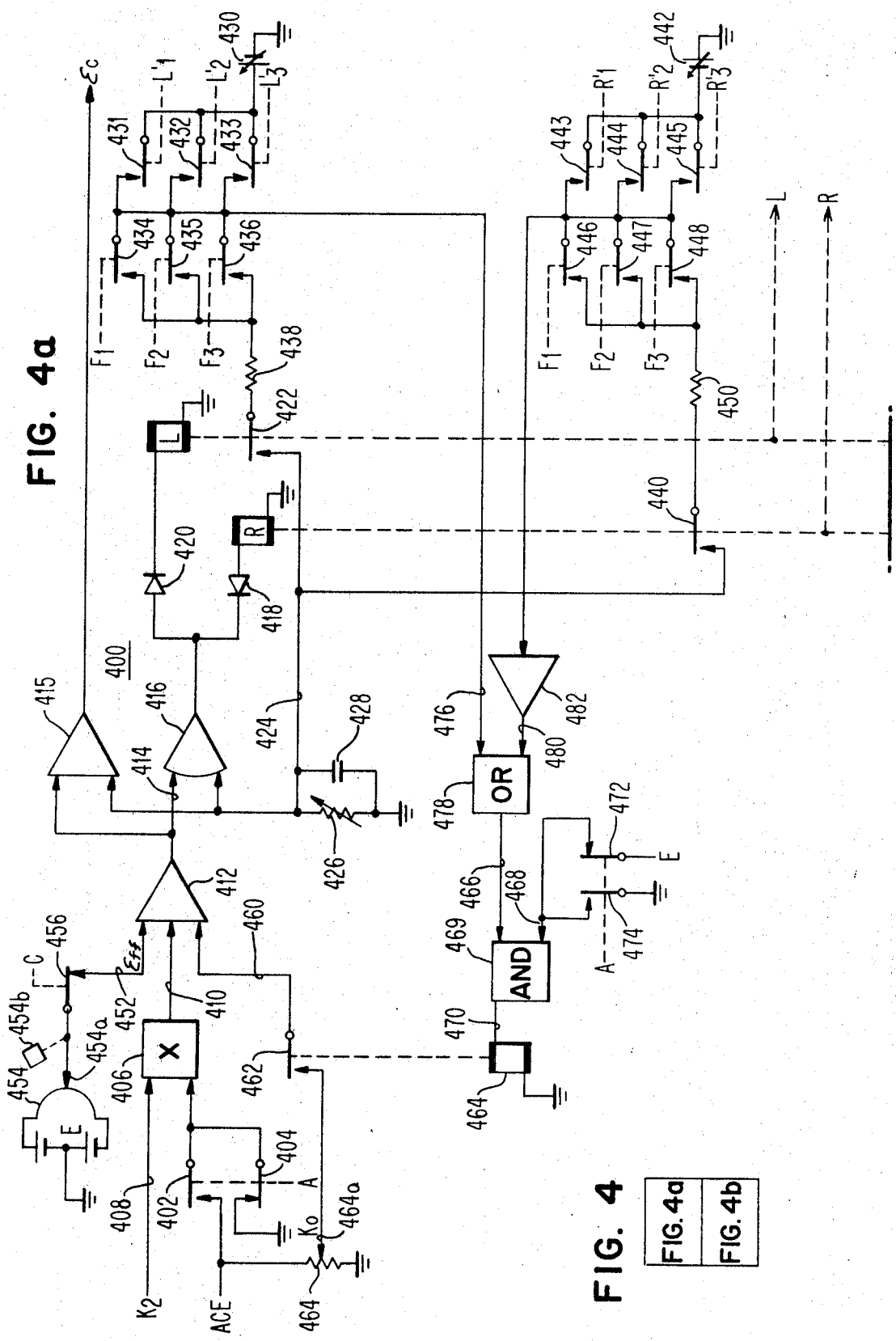

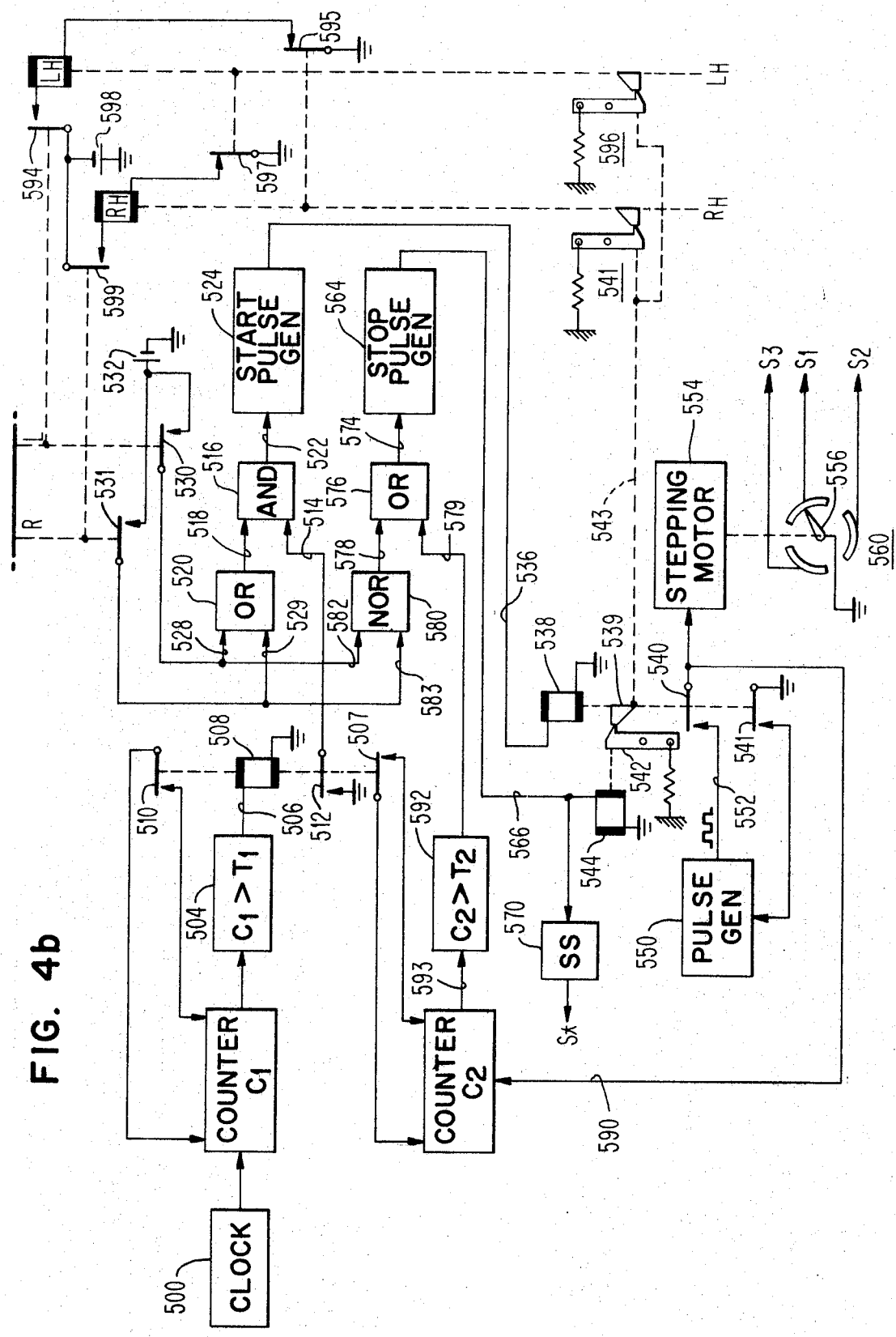

3,525,857
LOAD-FREQUENCY CONTROL SYSTEM WITHOUT PROPORTIONAL WINDUP
Frederick B. Davis III, Drexel Hill, and Charles W. Ross, Hatboro, Pa., assignors to Leeds & Northrup Company, Philadelphia, Pa., a corporation of Pennsylvania
Filed Mar. 14, 1968, Ser. No. 713,124
Int. Cl. H02j 3/04
U.S. Cl. 235—151.21                                     5 Claims

ABSTRACT OF THE DISCLOSURE

This load-frequency control system utilizes the area control error signal to indicate the amount of generation change necessary and to provide a plurality of adaptive signals when the area control error signal exceeds a predetermined value for a predetermined period of time. One of the adaptive signals modifies the area control error signal as it is utilized in the determination of a control signal for establishing the sense and magnitude of the changes to be made in the generation of the area under control while the other adaptive signal modifies the rate at which the generation change is made at each of the units as well as the number of units which participate in the control of generation.

Separate output pulses are provided for modifying the generation of the individual units. These pulses are provided at a rate and duration which relates to the desired change in generation and are in sense corresponding with the control signal. The desired change in generation is computed from the area control error signal, signals representative of the actual generation being produced and signals representative of the desired generation as long as the sign of the area control error signal corresponds with the sign of the control signal. On the other hand, the computation is made by substituting the control signal for the area control error signal when the signs of those signals are not the same.

The control incorporates feedforward signals representing predictable changes in generation. These feedforward signals modify the control of the generation to anticipate the changes.

CROSS-REFERENCES TO RELATED APPLICATIONS

The novel subject matter of the disclosure of this application not claimed herein is the subject of claims presented in U.S. patent application Ser. No. 602,048 of C. W. Ross filed Dec. 15, 1966.

BACKGROUND OF THE INVENTION

This invention relates to a method and means for load-frequency control of the permissive type for economically distributing the load of a particular area among a plurality of generating sources in the area to provide the most economic division of that load while avoiding a control action which may be termed proportional windup. In the normal permissive type of load-frequency control system, control action is permitted when the area control error is changing in a sense such that the control calls for a change in generation of sense corresponding with the sense of the calculated required change in generation. With the incorporation of proportional control action in the control it is possible with such a system to cause the blocking of the proportional control action as the area control error is returning to zero thus causing the control to overshoot and set up oscillations in the system.

In prior art systems, no provision has been made to prevent such a blocking action from occurring so that in some cases the proportional action which has been affected by the control system in response to an area control error, has not been removed as the system responded and the area control error was reduced to zero. Such a condition, for the purposes of this disclosure, is known as proportional windup.

SUMMARY OF THE INVENTION

In accordance with the present invention there is provided both a method and a means for controlling the distribution of load among a plurality of interconnected generating units in a power distribution area. The method comprises the production of an area control error signal for the area, an actual generation signal for each of the units of the area and signals representative of the desired generation of each of the units to provide a predetermined distribution such as an economic distribution of the load in the area, and the producing of a unit requirement signal from the above mentioned signals so long as the area control error signal is of the same sign as a control signal derived from the magnitude of the area control error signal and a feedback signal representative of the control action previously taken. The unit requirement signal computation is altered to substitute the above mentioned control signal for the area control error signal whenever the sign of the control signal differs from that of the area control error signal so that the control of the units in response to the control signal will be effected to change the generation in correspondence with the unit requirement signals without such control action producing proportional windup.

Also illustrated is a means for preventing proportional windup in the system controller.

Figure 3:
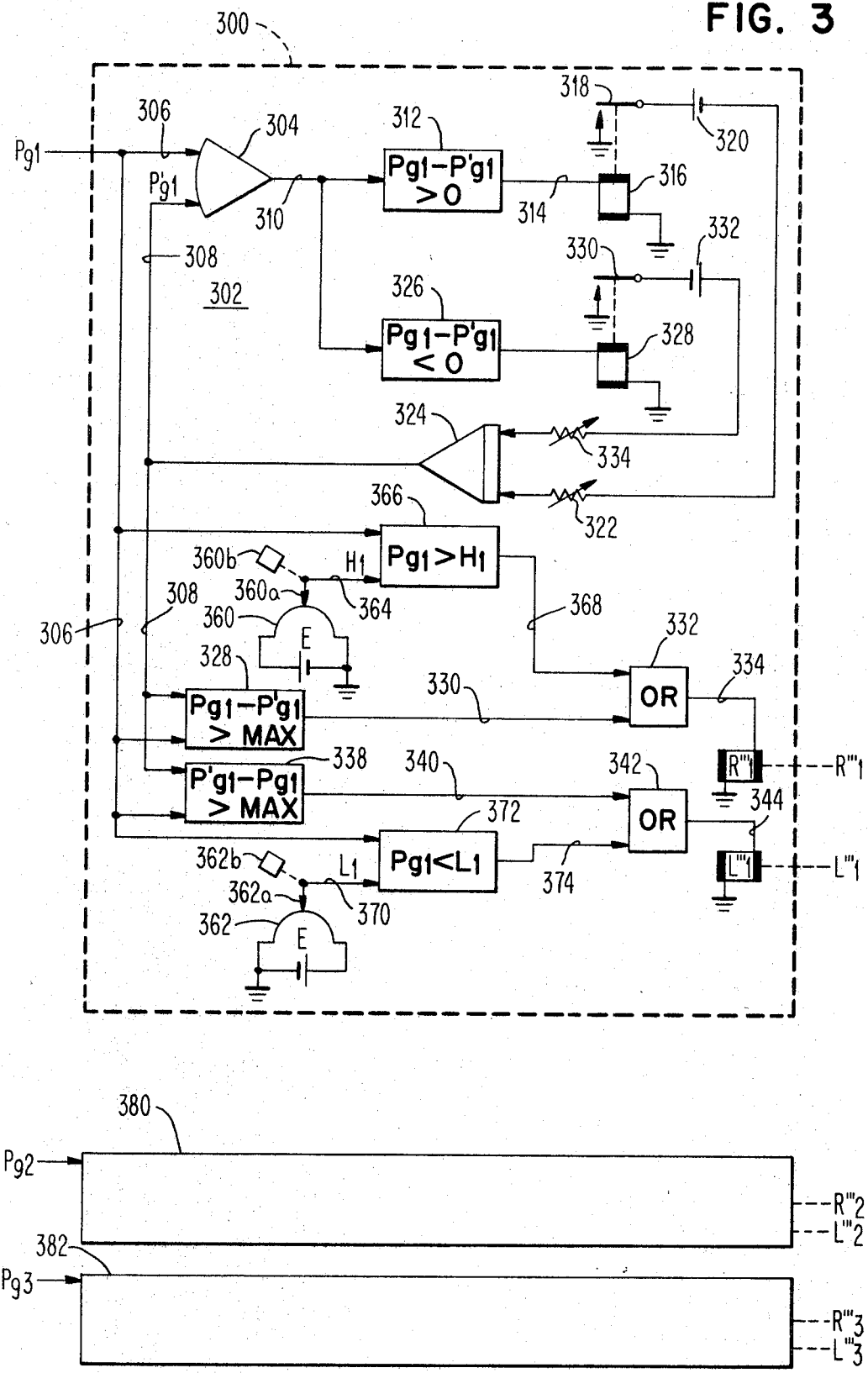

FIG. 3 schematically illustrates means for limiting the rate at which the generation of the several units would be altered by the control system under certain constraints.

FIG. 4 shows the manner in which FIGS. 4a and 4b can be placed in juxtaposition to provide the proper connection of the several elements incorporated in those figures FIG. 4a schematically illustrates the master controller for the load-frequency control system.

FIG. 4b schematically illustrates the means for sequencing the several operations provided for by the elements of the other figures.

Those novel aspects of the present disclosure not claimed herein are claimed in copending U.S. patent application Ser. No. 602,048 filed Dec. 15, 1966 by C. W. Ross, a co-inventor herein.

DESCRIPTION OF THE PREFERRED EMBODIMENT

In the drawings reference characters below, 200 identify elements in FIG. 1 while those in the 200's, 300's, 400's and 500's identify elements in FIGS. 2, 3, 4a and 4b, respectively. Lines bearing like signal identifications are connected and relay contacts are operated by actuators identified by the same reference characters as the mechanical coupling connected to the relay contact where direct connection between the actuators and contacts is not shown.

Figure 1:
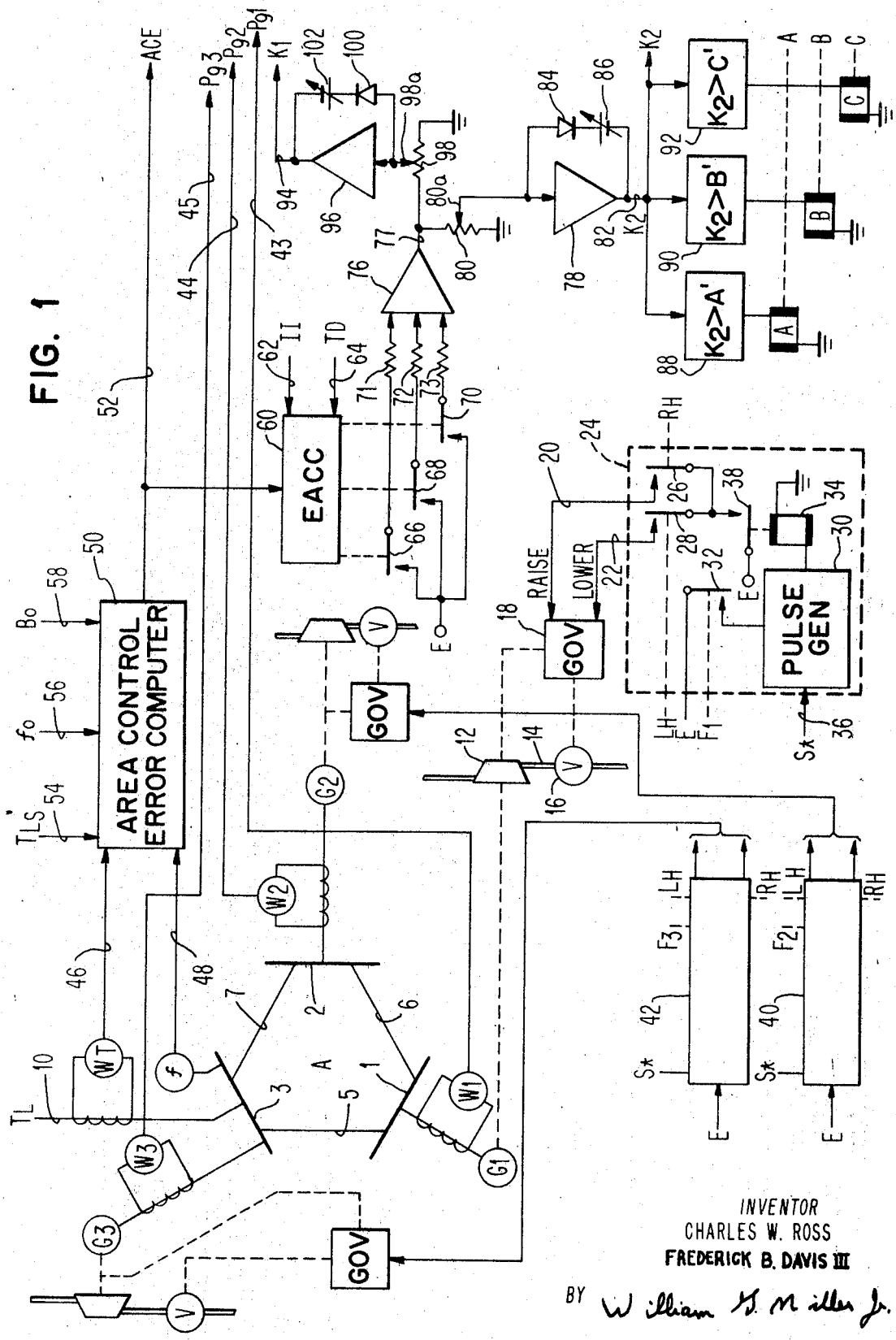
FIG. 1 schematically illustrates a load distribution system provided with means for computing the area control error and for producing therefrom a plurality of adaptive signals as well as means for providing the output control pulses for changing the generation of the individual units.

In FIG. 1 there is shown in simplified schematic form of a load distribution area A which comprises three separate stations indicated by the individual buses 1, 2, and 3. Each station is shown as having a single generator as its source of power; namely, generators $G_1$, $G_2$, and $G_3$. Each generator is shown connected to its associated bust and the individual buses are in turn connected by a plurality of interconnecting transmission lines 5, 6, and 7. The area A will normally have a plurality of loads, which for purposes of simplicity, are not illustrated. Similarly, the area A may be connected as shown to another area as by tie line 10 to provide for the convenient exchange of power between the area A and the area to which it is connected in accordance with prescheduled arrangements between the separate areas. Each of the generators of area A has as a prime mover a turbine such as turbine 12 for generator $G_1$. The turbine is supplied with steam through a line such as line 14 from a boiler. The amount of steam supplied through line 14 will depend upon the opening of valve 16 which is positioned by its mechanical linkage to governor 18. The governor 18 will normally be of the well-known flyball type connected by a mechanical linkage to respond to the speed of rotation of the turbine 12. The governor 18 will include a governor motor which will, in response to signals on either the "raise" input line 20 or the "lower" input line 22, be effective to adjust the governor linkages so as to provide a raise in generation of generator $G_1$ or a lowering of that generation at a particular frequency.

In FIG. 1 the output unit 24 provides the source of "raise" or "lower" pulses which are transmitted by its output lines 20 and 22 to the governor 18. The output unit 24 provides pulses on the output lines 20 and 22 selectively in dependence upon whether or not the "raise" relay contact 26 is closed or the "lower" relay contact 28 is closed. The operation of these relays is effected by relay operators to be described subsequently.

A pulse output from the output unit 24 originates from pulse generator 30 and is generated when relay contact 32 is closed by relay operator $F_1$ so as to connect the potential E to the input of the pulse generator 30. The pulse generator 30 will then produce a pulse of duration depending upon the duration of closure of relay contact 32 upon the introduction to the pulse generator 30 of the synchronizing pulse $S_t$ on line 36, and this pulse will cause operation of relay operator 34. During the energization of relay 34 the relay contact 38 is closed and current is then allowed to flow from the source E through the closed relay contact 38 and either relay contact 26 or 28 to the corresponding "raise" or "lower" lines 20 or 22 to provide the input to governor 18.

Pulse generator 30 is preferably a pulse stretcher which will be effective to produce pulse lengths to the governor motor which correspond to the megawatt change desired in response to the duration of closure of relay operator $F_1$.

The above description, while specifically directed to the control of the generation of the generator $G_1$, is equally applicable to the systems utilized for the control of the other generators; namely, generators $G_2$ and $G_3$. For simplicity of illustration, the output unit for the generator $G_2$ is shown in block form as unit 40 while the output unit associated with the operation of the governor for generator $G_3$ is shown as unit 42. Both units 40 and 42 are shown as having inputs comparable to those described for unit 24 with similar "raise" and "lower" channels for the output pulses of the units to provide control of the respective governors.

The generation of each of the generators of area A is measured by a wattmeter $W_1$, $W_2$, and $W_3$ to provide on lines 43, 44, and 45, respectively, signals $Pg1$, $Pg2$, and $Pg3$ representative of the actual generation of the individual generators.

Likewise, the power flow of tie line 10 is monitored by wattmeter $W_T$ to provide on line 46 a signal representative of the tie line power flow.

There is also provided a frequency meter $f$ connected to bus 3 which provides on line 48 a signal representative of the instantaneous frequency of the generation in area A.

An area control error computer 50 is provided for producing on line 52 a signal ACE. The computation of area control error is a well-known computation and includes in addition to the measurement of tie line power flow introduced on line 46 and the frequency introduced on line 48, input signals indicative of the scheduled tie line flow over tie line 10 as introduced on line 54, the set frequency $f_0$ as introduced on line 56, and the tie line bias $B_0$ as introduced on line 58. One type of apparatus which may be utilized for computing the area control error is that shown in Pat. No. 2,688,728 issued to J. B. Carolus on Sept. 7, 1954. It should be kept in mind that the quantity area control error and the quantity known as area requirement are similarly calculated; the one, however, is of opposite polarity to the other.

For the purpose of providing adaptive signals there is shown in FIG. 1 an error adaptive control computer (EACC) 60 which utilizes as one of its inputs the area control error computed by the computer 50 and produced thereby as an output on line 52. Additional inputs to the EACC can include the inadvertent interchange which may be introduced on line 62, and the deviation of the system time, or in other words, the time deviation of the system from the standard as introduced on line 64. The inadvertent interchange and the time deviation may be measured by well-known means or these inputs may be periodically hand set. Apparatus of the type which can be utilized for the EACC 60 is illustrated and described in paper 31 TP 66–60 presented at the IEEE Winter Power Meeting, New York, N.Y., Jan. 30–Feb. 4, 1966, by the present inventors, and entitled, "Error Adaptive Control Computer for Interconnected Power Systems." Likewise, a description of apparatus of the type which can be utilized for EACC 60 is described in present inventors' patent application Ser. No. 399,216 filed Sept. 25, 1964.

As outputs of the EACC 60 there are shown three relay contacts which are operated by relays internal to the EACC. These three relay contacts may, for example, be contacts of the relays $A_2T_2$, $A_1T_1$, and $A_1T_1'$ of FIG. 3 in the above referenced IEEE paper. Thus, the contact 66 may be caused to close when the area control error, weighted as disclosed in the above referenced IEEE paper, has deviated from zero by a first predetermined amount $A_2$ for a first predetermined period $T_2$ of time while contact 68 will be closed when the area control error has deviated from zero by a second predetermined amount $A_1$ for a second predetermined period $T_1$ where the second predetermined amount and the second predetermined period can be both greater than the first predetermined amount and the first predetermined period.

Similarly, the contact 70 could be closed when the weighted area control error has deviated from zero by a predetermined amount $A_1$ and for a predetermined period $T_1'$.

It will thus be evident that depending upon the values of the input resistors 71, 72, and 73 the output signal of operational amplifier 76 on line 77 will vary in dependence upon which of the relay contacts 66, 68, and 70 are closed. For example, when the relay contact 66 is closed, current will be allowed to flow from the source E through the closed contact and input resistor 71 to amplifier 66 to provide a signal on line 77. The signal on line 77 will be increased when the relay contact 68 is closed and it will be further increased when the relay contact 70 is closed.

From the signal produced on line 77 by operational amplifier 76 there is produced a first and second adaptive signal $K_1$ and $K_2$. $K_2$, for example, is produced as an output of operational amplifier 78 whose input is derived from the tap 80a of slidewire 80 shown in FIG. 1 as connecting line 77 to ground. The adaptive signal $K_2$ which is produced on line 82 is limited in value by the circuit shown as shunting amplifier 78; namely, the circuit including diode 84 backbiased by a variable potential source 86 whose potential is adjustable to adjust the limit which the output on line 82 may reach.

The adaptive signal $K_2$ is utilized to operate a plurality of relay operators A, B, and C. The signal $K_2$ on line 82 is compared by comparator 88 to a value A', and when the signal exceeds that value, the relay operator A is energized and will then be effective to alter from the positions shown all of the relay contacts operated by that relay operator.

Similarly, comparator 90 compares the value of the adaptive signal $K_2$ with a value B' and when the signal $K_2$ is greater than B', the relay operator B is energized to cause all of the associated relay contacts to change position.

In like manner there is provided a comparator 92 which compares the value $K_2$ with the value C', and when the former exceeds the latter, the relay operator C is energized to cause all of the associated relay contacts to change position.

It should be kept in mind that in the apparatus to be described all of the relay contacts are shown in positions corresponding with the positions assumed when the associated relay operators are deenergized and the relay contacts take another position to either make or break the circuit in which they are incorporated upon energization of the associated relay operator.

Another adaptive signal is produced as signal $K_1$ on output line 94 from operational amplifier 96 which obtains its input from the variable tap 98a of slidewire 98 shown as connecting line 77 to ground. In a manner similar to that described for the adaptive signal $K_2$, the adaptive signal $K_1$ is limited in value by introducing a shunting circuit for amplifier 96. This shunting circuit incorporates diode 100 which is backbiased by a variable source of potential 102.

From the above it will be evident that the apparatus of FIG. 1 produces the area control error signal as well as signals representing the actual generation of each of the generators in area A. In addition, the apparatus of FIG. 1 produces a first and second adaptive signal with the second adaptive signal being utilized to provide for the selective operation of any of three separate relay operators A, B, and C in dependence upon its magnitude.

In addition, FIG. 1 shows the manner in which the output control units effect a change in generation by selectively sending "raise" or "lower" pulses to the governors for control of the generation of the several units in the area.

Figure 2:
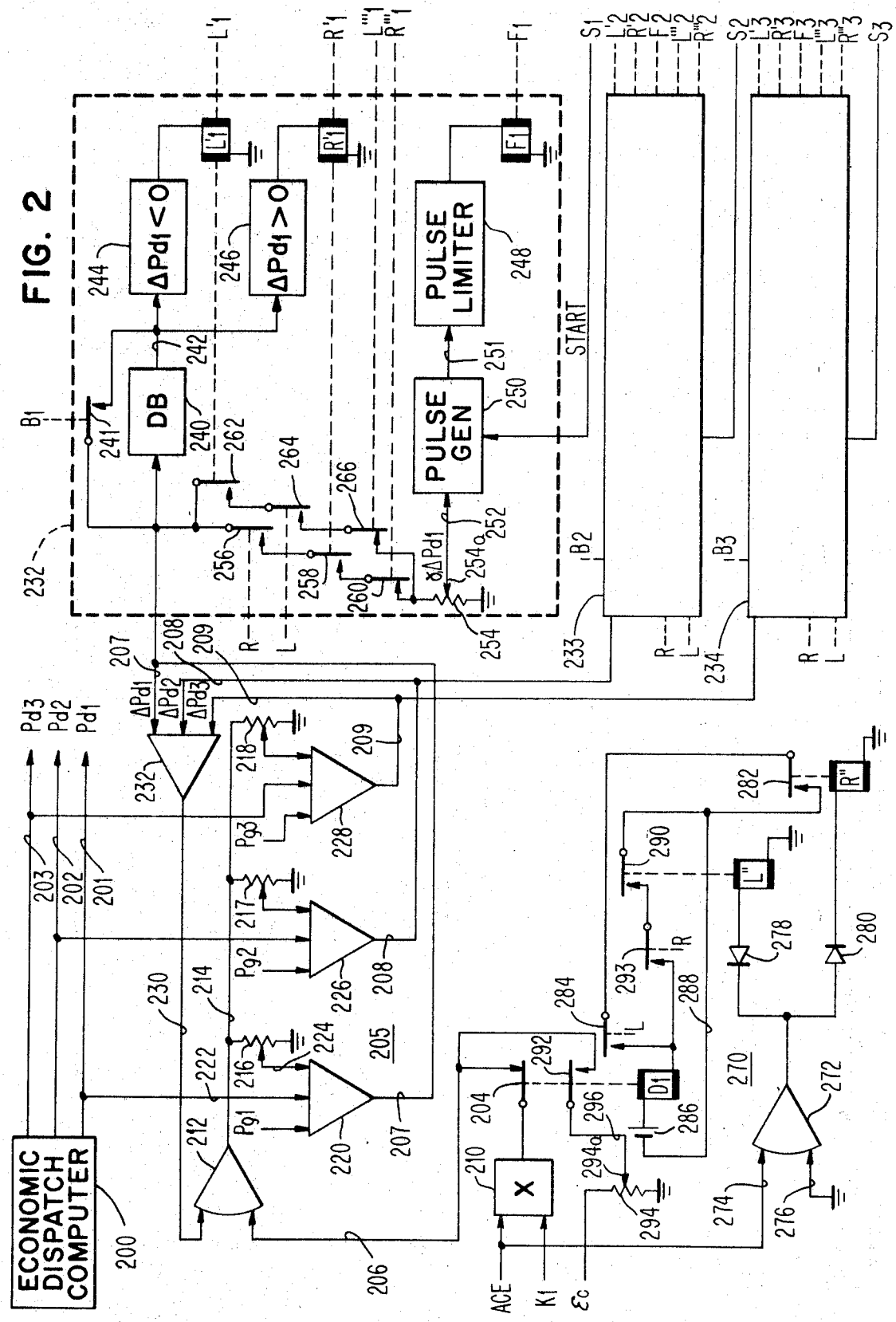
FIG. 2 schematically illustrates means for providing the computation of the economic division of the load in the area, for constantly updating that computation and providing signals indicative of the change in generation required for each of the units.

With reference to FIG. 2 there is shown as a single block 200 an economic dispatch computer. This economic dispatch computer may be a digital or analog computer such as those well-known in the art which are capable of providing as outputs signals representative of the desired generation for each of the generators of the area A for an economic dispatch of the load in area A at the time of the particular economic dispatch computation was carried out by the computer 200. These particular output signals are produced as signals P$d$1, P$d$2, and P$d$3 on lines 201, 202, and 203, respectively. These particular values, as established for the economic dispatch of the load in area A, may be computed by taking into account not only the economic factors at the individual stations but also the losses in the transmission lines 5, 6 and 7 of area A. It will thus be evident that the computation carried out by computer 200 may be complex in nature, and since many different types of apparatus are presently known for providing the desired generation values mentioned, this computer is not shown in detail but is represented by a block.

Between the times when the economic dispatch computer is utilized to compute the desired generation values for economic loading of the generating units of area A it is necessary to constantly update those values by taking into account the variations in area control error and the generation changes since the last economic dispatch computation. This is accomplished by a computing network 205 which has as one of its inputs a signal on line 206 representative of the effective total change in generation desired for the area. The network 205 then produces on lines 207, 208, and 209, in a manner to be described, output sginals $\Delta$P$d$1, $\Delta$P$d$2, and $\Delta$P$d$3 which represent, respectively, the effective unit requirements or, in other words, the change in generation required for the units $G_1$, $G_2$, and $G_3$ to provide for an economic distribution of the load in area A. These effective values differ from the actual values by the factor $K_1$.

When the relay operator $D_1$ is deenergized so that contact 204 is closed, the signal produced on line 206 is then the product of area control error and the adaptive signal $K_1$, the product being formed by the multiplying circuit 210, which is shown as receiving input signals ACE and $K_1$. Thus, the signal on line 206 is directly related to the area control error and hence the amount of change in generation required in the area A in order for the area to take care of its own load. The signal on line 206 forms one of the inputs to the high gain amplifier 212 which has no local feedback. The output line 214 of the amplifier 212 is then connected to ground through individual potentiometers 216, 217, and 218 having variable taps which can be adjusted as by manual adjustment or by automatic adjustment to determine the percentage participation of the respective units $G_1$, $G_2$, and $G_3$ in the control of the generation in area A to reduce the area control error toward zero while economically dividing the load.

Considering first the manner in which the signal $\Delta$P$d$1 is determined, it will be seen from FIG. 2 that the operational amplifier 220 has as one of its inputs the signal P$g$1 representing the actual generation of the generator $G_1$ and the signal on line 222 which is connected to line 201 and which provides a signal representative of the desired generation as computed at the last economic dispatch computation. The other input to amplifier 220 appears on line 224 and represents a fractional part of the signal appearing on line 214 and may be considered as indicative of the percentage of the change in generation assigned to $G_1$ beyond that assigned by the last economic dispatch. From these inputs the amplifier 220 produces an output on line 207 representative of the effective unit requirement for generator $G_1$, or in other words, the effective change in generation desired for that unit.

In similar manner, the amplifiers 226 and 228 provide outputs on lines 208 and 209, respectively, representative of the effective unit requirement for generators $G_2$ and $G_3$. The amplifier 212 receives as a feedback signal the signal on line 230 which is derived from the summation of the signals on lines 207, 208, and 209 by amplifier 232 or, in other words, a signal which represents the sum of the effective unit requirements. Thus, amplifier 212 is effective to vary the current in its output on line 214 until the signals on lines 206 and 230 are substantially equal.

As will now be described, the unit control elements 232, 233, and 234 utilize the respective unit requirement signals on lines 207, 208, and 209, respectively, as well as start signals $S_1$, $S_2$, and $S_3$ and relay contacts operated from relay operators $L_1'''$ and $R_1'''$ and relay contacts operated from relay operators R and L to provide for selective actuation of relay operators $L_1'$ or $R_1'$ to determine whether "lower" or "raise" pulses are needed by generator $G_1$ and relay operator $F_1$ providing an indication of the amount of change in generation desired on unit 1. Similar inputs and outputs are provided for the units 233 and 234.

The signal $\Delta$P$d$1 introduced as an input to control element 232 is connected by way of line 207 to a dead-band circuit 240 which is effective to produce an output on its output line 242 only when the signal $\Delta$P$d$1 is greater than a predetermined amount as established by dead-band circuit 240. When that is the case, the signal on line 242 will increase and decrease with the signal on line 207 so that essentially the signal on line 242 corresponds with $\Delta Pd1$ except when $\Delta Pd1$ is within the dead-band.

The signal on line 242 is introduced as an input to comparators 244 and 246. Comparator 244 produces an output signal operative to energize relay operator $L_1'$ when the signal $\Delta Pd1$ appearing on line 242 is negative or, in other words, when the unit requirements for unit 1 is such that a decrease in generation of the generator $G_1$ is required. The comparator 246, on the other hand, is effective to produce an output signal which will cause the energization of relay operator $R_1'$ whenever the input signal on line 242, namely $\Delta Pd1$, is positive thus indicating a need for an increase in generation on generator $G_1$.

The unit 232 is also effective to produce an energization of relay operator $F_1$ for a period directly related to the magnitude of the signal $\Delta Pd1$ so that the duration of energization of relay operator $F_1$ is in terms of megawatts change in generation desired for generator $G_1$.

The relay operator $F_1$ is energized by a signal from pulse limiter 248 which serves to limt the duration of the pulses sent to relay operator $F_1$ and thereby limit the rate at which the generation of $G_1$ will be changed. Pulse limiter 248 is connected to receive the pulses generated by pulse generator 250. The pulses which appear at the output of pulse generator 250, namely on line 251, are generated so as to have a duration proportional to the input signal on the input line 252 of pulse generator 250. As indicated in FIG. 2, the signal on line 252 is some fraction of the signal $\Delta Pd1$ as established by the position of tap 254a of slidewire potentiometer 254 so that the signal may be represented as $\gamma_1 \Delta Pd1$ where $\gamma_1$ represents the position of tap 254a.

The signal $\Delta Pd1$ which appears on line 207 is connected to the upper end of slidewire 254 which has its lower end connected to ground. The connection between line 207 and slidewire 254 is, however, completed only when one of two alternative paths between those points is completed by the interposed relay contacts. For example, the circuit between line 207 and the upper end of slide-wire 254 is completed if the relay contact 256 is closed by an energization of relay operator R by the master controller, to be explained subsequently, and if simultaneously there is an energization of the relay operator $R_1'$ to close relay contact 258, along with an absence of any opening of relay contact 260 by energization of relay operator $R_1'''$ indicating a constraint on generator $G_1$. The operation of relay operator $R_1'''$ will be described in the subsequent description of FIG. 3.

Alternatively, the path between line 207 and the upper end of slidewire 254 may be completed by the coincident closure of relay contact 262 by relay operator $L_1'$ and the closure of relay contact 264 by the energization of relay operator L in the master controller with an absence of any opening of relay contact 266 by energization of relay operator $L_1'''$.

Effectively, the signal $\Delta Pd1$ appears across the slidewire 254 if the master controller is calling for a raise in generation in the area as by the energization of relay operator R, and if the unit requirement $\Delta Pd1$ is beyond the dead-band and is greater than zero so as to cause an energization of relay $R_1'$, and if also there are no constraints which would dictate the unfeasibility of an increase of generation of generator $G_1$ which constraint would be indicated by the opening of relay contact 260 by energization of relay operator $R_1'''$. Alternatively, the signal $\Delta Pd1$ will appear across slidewire 254 if the master controller calls for a decrease in generation thus closing contact 264, and if $\Delta Pd1$ is beyond the dead-band and less than zero thus causing the closure of relay contact 262, if there are no constraints which would dictate the unfeasibility of decreasing generation of generator $G_1$ and hence cause the opening of relay contact 266.

The pulse produced by pulse generator 250 is produced at a particular time as established by the introduction of the start signal on line $S_1$. As will be explained subsequently, the start signals appearing on lines $S_1$, $S_2$, and $S_3$ appear sequentially so that the individual relay actuators $F_1$, $F_2$, and $F_3$ would be energized sequentially.

FIG. 2 also includes the actuating circuit 270 for relay operator $D_1$. This circuit includes a high gain amplifier 272 which has as one input the signal ACE on line 274, the other input being connected to ground by line 276. The output circuit of amplifier 272 includes parallel circuits so that there is produced an energization of relay operator $L''$ or $R''$ depending upon whether or not the signal ACE is above or below ground. These parallel circuits include diode 278 which connects with the output of amplifier 272 causes an energization of relay operator $L''$ whenever the signal ACE is of polarity such that a decrease in generation is being called for.

The other parallel circuit includes diode 280 poled opposite to diode 278 so that the relay operator $R''$ is energized when the signal ACE indicates that there is a need for an increase in generation in the area A.

If the sign of the signal ACE is such that an increase in generation is necessary to cause the area A to carry its own load, then the relay operator $R''$ will be energized and relay contact 282 will be closed. If simultaneously the master controller calls for a decrease in generation as by the energization of its relay operation L, then relay contact 284 will also be closed and current can flow from battery 286 to relay operator $D_1$ by way of relay contacts 282 and 284 and return line 288. Thus, relay operator $D_1$ is energized whenever the area control error indicates a change in generation required for the area of opposite sense to that called for by the master controller. This situation would exist, for example, if the area control error called for an increase in generation but simultaneously the master controller called for a decrease in generation because the area control error magnitude was decreasing toward zero.

Since, as will be explained in the subsequent explanation of the master controller, there is proportional action as well as reset action introduced into the control of the system, it is important that the proportional action which is effective to change the generation in one sense as the area control error is moving away from zero is also effective to change the control error in an opposite sense as the area control error moves back toward zero. In other words, any control action put into the system as the controlled variable (in this case area control error) deviates from zero must eventually be removed as the controlled variable returns toward zero to prevent what may be called proportional windup.

The input signal on line 206 which is effective to produce the unit requirement signals on lines 207, 208, and 209 and hence to determine the energization of relay operators $L_1'$, $R_1'$, and $F_1$ is changed from being a signal which is the product of ACE and $K_1$ to a signal derived from the signal $\epsilon_c$ whenever the relay operator $D_1$ is energized to pull in relay contact 292 and disconnect contact 204. The signal $\epsilon_c$ is introduced at the top of slidewire 294 so that its movable contact 294a produces on line 296 a signal which is a function of the signal $\epsilon_c$. The signal on line 296 is then connected by way of a closed relay contact 292 to line 206.

With reference to FIG. 3, there is shown a constraint detection unit 300 which receives as an input signal Pg1 representative of the actual generation of generator $G_1$. The constraint detection unit 300 produces as its outputs relay actuations in response to the energization of relay operator $R_1'''$ and $L_1'''$. The energization of relay operator $R_1'''$ indicates that a constraint has been placed upon the unit $G_1$ and that its generation is such that no further increase in generation should be allowed in the control of that generator. In similar fashion, the energization of relay actuator $L_1'''$ is indicative of the fact that a constraint has been placed upon generator $G_1$ such that no further decrease in generation should be allowed in the control of generator $G_1$.

While the system A may have a number of factors which must be taken into account to determine whether or not a further increase or decrease in generation can be tolerated, the constraints which are particularly described in FIG. 3 are those relating to the maximum or minimum generation which is desired for generator $G_1$ and the maximum rate at which the stored energy of the generator may be utilized as well as the maximum rate at which the generation can be changed after the stored energy has been utilized.

Unit 300 includes a circuit 302 designed to produce from the signal $Pg1$ a reference signal $Pg1'$ which will increase or decrease at the maximum rate at which the generation of generator $G_1$ is to be allowed to increase or decrease after the stored energy of the generator has been utilized. To produce this signal $Pg1'$ there is utilized a high gain amplifier 304 having as one input the signal $Pg1$ on line 306 and as its other input, the signal $Pg1'$ on line 308. The difference between those input signals causes an output signal to be produced on line 310 which represents that difference. When the signal on line 310 indicates that the difference is greater than zero, comparator 312 produces an output to line 314 to energize relay operator 316 to pull in relay contact 318 and complete a circuit from ground through relay contact 318, battery 320, and variable input resistor 322 to one of the input terminals of integrating amplifier 324 so as to cause a continuing change in the output of amplifier 324 to line 308. This continual change of the signal $Pg1'$ establishes a maximum rate at which the generation of generator $G_1$ will be allowed to increase after the stored energy of the generator has been utilized.

Similarly, the comparator 326 will be effective when the difference signal appearing on line 310 is less than zero to energize relay operator 328 to pull in relay contact 330 thus completing the circuit from ground through relay contact 330, battery 332, and variable input resistor 334 to another input terminal of integrating amplifier 324. Because the battery 332 is poled opposite to battery 320, the output signal of amplifier 324 will be caused to change in an opposite direction when relay contact 330 is closed as compared with the direction of change which will be effected when relay contact 318 is closed. It will, therefore, be evident that the relay signal on line 308, namely $Pg1'$, will either increase in a positive or a negative direction linearly depending upon whether the signal $Pg1$ is greater than $Pg1'$ or less than $Pg1'$.

If the signal $Pg1$ on line 306 is sufficiently greater than the signal $Pg1'$ on line 308 so that the difference is beyond the maximum which is established in accordance with the amount of stored energy available, then comparator 328 will produce a signal on its output line 330 to thereby provide an input to the "or" gate 332 which will be effective to produce a signal on its output line 334 operative to energize relay operator $R_1'''$ thus indicating that a constraint exists such that further increase in generation of generator $G_1$ should not be effected.

Similarly, if the signal on line 306 is less than the signal on line 308 by an amount greater than a maximum indicative of the maximum rate at which the generation can be decreased instantaneously then the comparator 338 will produce a signal on its output line 340 to provide an input to "or" gate 342 and thereby produce an output on line 334 which will be effective to energize relay operator $L_1'''$. The energization of relay operator $L_1'''$ indicates a constraint on generator $G_1$ so that no further lowering of the generation should be made as a result of the control action.

The "or" gates 332 and 342 can be utilized to introduce other constraints. For example, a high limit $H_1$ for the generation of generator $G_1$ may be set by adjusting the position of the movable contact 360a on slidewire 360 by adjusting knob 360b just as the lower limit $L_1$ of the generation which is desired on generator $G_1$ can be set by adjusting the contact 362a on slidewire 362 by adjusting knob 362b. Since both the slidewire 360 and the slidewire 326 are supplied by a potential source E, there is produced at the respective contacts 360a and 362a potentials depending upon the relative position of the contact on the respective slidewires 360 and 362. There is thus established on line 364 a signal representing a high limit for the actual generation value $Pg1$. By means of comparator 366 the signal $Pg1$ from line 306 is compared with the signal on line 364, and if it is greater, that is if $Pg1$ is greater than $H_1$, then a signal appears on the output line of 366, namely line 368, to provide an input to "or" gate 332 which will serve to provide an output on line 334 which will energize relay $R_1'''$ indicating a constraint has been reached, namely, that the generator has reached its high limit and thus indicating that no further increases should be made on that generator.

Similarly, if the signal on line 370 from slidewire tap 362a representing the low limit $L_1$ is compared with the signal $Pg1$ derived from line 306 by comparator 372, and if $Pg1$ is found to be less than $L_1$, then comparator 372 produces on its output line 374 a signal which provides an input to "or" gate 342 and consequently an output signal on output line 344 effective to energize relay operator $L_1'''$. The energization of relay operator $L_1'''$ is, of course, indicative of a constraint upon the further lowering of the generator $G_1$.

For generators $G_2$ and $G_3$ there are provided similar constraint detecting units 380 and 382 which are similar to unit 300 and have comparable inputs and outputs.

In FIGS. 4a there is shown the master controller 400 which is effective to determine whether "raise" or "lower" output pulses will be sent to the governor motors of the several units in area A. Several inputs are utilized to determine which sense of control will be permitted. When the area control error ACE is sufficiently great so that the second adaptive signal $K_2$ exceeds the value necessary to cause an energization of relay operator A in FIG. 1, then relay contact 402 is closed and relay contact 404 is open so as to connect the signal ACE to one input of the multiplier 406 and to disconnect from that input the ground connection previously applied through the closed relay contact 404. The other input to the multiplier 406 by way of line 408 is the second adaptive signal $K_2$. The signal $K_2$ is multiplied by the signal ACE to give a signal on line 410 as an input signal to amplifier 412 which signal represents the product of the signal ACE of signal $K_2$ and is, therefore, indicative of the sense of the change in generation desired in area A and is related to the magnitude of change necessary for it to assume its own load.

Assuming for the moment that there are no inputs to amplifier 412, a signal line 410 will then produce on the output of amplifier 412 a signal on line 414 as one input to the high gain amplifier 416. The high gain amplifier 416 has in its output circuit parallel circuits for energizing, respectively, the relay actuators R and L. When the output of amplifier 416 is of one polarity, the diode 418 is conductive and current flows through relay actuator R. On the other hand, if the signal on the output line of amplifier 416 is of an opposite polarity, the diode 420 is forward biased so that current flows through the relay actuator L. The energization of relay actuator R represents that system conditions are such that an increase of generation is required in the area for it to meet its load properly, whereas if the relay actuator L is energized, this is an indication that a decrease is desired in the generation of area A.

If we assume, for example, that the relay actuator L is energized, then it will be evident that relay contact 422 will be closed to allow feedback signals to be introduced in the feedback line 424 to the parallel coupled resistor and capacitor 426 and 428, respectively. The parallel coupled resistor and capacitor are connected from line 424 to ground with the line 424 being connected also as a feedback input to amplifier 416. As will be explained, the feedback line 424 receives pulses representative of the amount of change in generation required in the area A and these pulses serve to change the charge on capacitor 428. As the charge on capacitor 428 is changed, the signal on line 424 providing one input to amplifier 416 approaches the signal on line 414 which is the other input to amplifier 416 thus the relay actuator L, for example, will be energized until the capacitor 428 is charged sufficiently to bring the signals on lines 414 and 424 to equality. This feedback arrangement indicates the manner in which proportional control is effected in that for each pulse that is introduced into the feedback circuit to charge capacitor 428, there will be produced an output pulse to one of the generators in area A.

Resistor 426 in shunt with capacitor 428 allows for the discharge of capacitor 428 during the periods between the pulses introduced on line 424 as feedback pulses. The discharge rate is adjusted by variable resistor 426. By this means the master controller 400 provides reset action in that more feedback pulses and hence more output pulses are necessary in order to balance the inputs to amplifier 416 depending upon the deviation of the signals on lines 414 and 424.

With relay actuator L energized to close contact 422, it will be evident that the feedback path is from ground through the battery 430 and one of the contacts 431, 432, or 433, respectively, closed by the energization of relay actuators $L_1'$, $L_2'$, and $L_3'$ and one of the contacts 434, 435, or 436 which are, respectively, closed by the energization of relay actuators $F_1$, $F_2$, and $F_3$ to complete the circuit through feedback resistor 438.

It will be evident from reference to FIG. 2 and particularly to the manner in which the relay actuators $L_1'$ and $F_1$ are energized that current pulses will be produced on the feedback line 424 of magnitude depending upon the duration of closure of contact $F_1$ for resistor 438 is preferably a high resistance so that battery 430 appears to be a current source. Since, as previously mentioned, relay actuators $F_1$, $F_2$, and $F_3$ are never simultaneously energized but are instead sequentially energized, there will only be a single path from ground through battery 430 to resistor 438 at any one time.

If the relay actuator R is energized instead of relay actuator L and due to the polarity of signal ACE being such that an increase in generation is called for by the system, then relay contact 440 will be closed and the feedback current to feedback line 424 will be provided from the ground connection through battery 442, one of the relay contacts 443, 444, or 445, respectively, closed by relay actuators $R_1'$, $R_2'$, and $R_3'$ and one of the relay contacts 446, 447, or 448, respectively, closed by the relay actuators $F_1$, $F_2$, and $F_3$ to high impedance feedback resistor 450 which is in turn connected through contact 440 to feedback path 424. It will thus be seen that because of the opposite polarity of battery 442 as compared with that of battery 430 pulse of an opposite sense will be fed into feedback line 424 when the relay actuator R is energized and one of the R' relay actuators is energized along with the energization of one of the F relay actuators. For example, if relay actuator $R_1'$ is energized, relay contact 443 will be closed and if at the same time relay actuator $F_1$ is energized, contact 446 will be closed thus completing a path for current flow through the closed relay contact 440 in a direction to charge capacitor 428 in one direction whereas the pulse introduced in the previous example when the relay actuator L was energized were pulses of polarity to charge capacitor 428 in an opposite direction.

The inputs to amplifier 412 may include not only the signal appearing on line 410 but may also include a signal on line 452 which may be a feedforward signal $e_{ff}$ which is shown in FIG. 4a as being derived from the positioning of contact 454a on slidewire 454 by knob 454b. Since the slidewire 454 is supplied with a potential source E, there is a potential that appears at its contact 454a. This potential will be introduced as an input to amplifier 412 on line 452 upon closure of relay contact 456 in the absence of energization of relay actuator C of FIG. 1 indicating that the second adaptive signal $K_2$ has not exceeded a value C' and that a feedforward signal can be utilized to anticipate a change in generation which will be introduced into the system due to a change in the system conditions. For example, if there is a change in the value of the signal $TL_s$ introduced on line 54 to the area control error computer 50 in FIG. 1, it is evident that a change in generation in area A will be necessary to accommodate this change in tie line interchange and, therefore, this change in generation can be anticipated by the introduction of a comparable signal from slidewire 454 where the signal introduced from slidewire 454 represents the rate of change introduced in the signal on line 54 of FIG. 1. As will be more evident from the subsequent description of the operation of this system, the operation of the feedforward signal on line 452 will cause the generation in area A to change in anticipation of the change which would have occurred only as a result of the change in signal ACE which will, of course, not influence the operation of the master controller 400 unless the relay actuator A is energized to close relay contact 402. Thus the introduction of feedforward signal will be effective to cause a generation regardless of the state of relay actuator A.

In order to provide for a change in generation in area A in accordance with the desired economic division as determined by the computation of the values $\Delta Pd1$, $\Delta Pd2$, and $\Delta Pd3$ even when the area control error is of a magnitude insufficient to cause the second adaptive signal $K_2$ to produce an energization of relay actuator A, it is necessary to provide for another input to amplifier 412 which will cause the controller 400 to energize either the relay actuator L or the relay actuator R. This input appears on line 460 upon closure of contact 462 by relay actuator 464. When the relay contact 462 is closed, a portion of the area control error signal, namely $K_0$ times ACE, is provided on line 460. This is produced by the positioning of contact 464a on slidewire 464 in accordance with the value $K_0$.

The relay actuator 464 will be energized only when there is an input on both input lines 466 and 468 of the "and" gate 469 to thereby provide an output from the "and" gate on line 470. It will be evident from FIG. 4a that an input is provided on line 468 whenever the contact 472 is closed as shown so that the source E is connected to line 468. If contact 472 is opened and contact 474 is closed as by the energization of relay actuator A, then the line 468 is connected to ground and no output appears from the "and" gate on line 470.

The conditions for producing a signal on line 466 into the "and" gate 469 required either the production of a signal on line 476 as one of the inputs to the "or" gate 378 or a signal on line 480 as one of the other inputs to "or" gate 478. A signal will appear on line 476 whenever any of one of the relay contacts 431, 432, or 433 is closed as by the energization of the respective relay actuators $L_1'$, $L_2'$, or $L_3'$. Likewise, a signal will appear on line 480 as an output from sign changing amplifier 482 only when one of the relay contacts 443, 444, or 445 is closed as by the energization of one of the respective relay actuators $R_1'$, $R_2'$, or $R_3'$.

It will thus be evident that the signal $K_0$ times area control error will be introduced on line 460 as an input to amplifier 412 only when the area control error is of a low value such that relay actuator A is deenergized and when one of the relay actuators L' or R' are energized indicating that one of the units is calling for either a decrease or an increase in generation in order to provide for the economic distribution called for by the signals $\Delta Pd1$, $\Delta Pd2$, and $\Delta Pd3$.

In FIG. 4b there is shown the synchronizing circuits which provide the sequential signals $S_1$, $S_2$, and $S_3$ and which also provide operation of relay contacts by the $L_H$ and $R_H$ relay actuators as will be explained. The sequencing operation is synchronized by the clock source 500 which supplies clock pulses to counter $C_1$. Counter $C_1$ in turn supplies its count $C_1$ to comparator 504 which compares the count $C_1$ to a predetermined count $T_1$, and if $C_1$ is greater than $T_1$, an output signal is produced on output line 506 to relay actuator 508 to actuate relay 508 and pull in relay contact 510. Relay contact 510 is connected to counter $C_1$ and serves as a reset circuit operative to reset the counter to zero each time the relay actuator 508 is energized. It will, therefore, be seen that relay actuator 508 is periodically energized depending on the clock rate and the predetermined count $T_1$. Upon each energization of relay actuator 508, relay contact 512 is closed to ground one of the inputs, namely, the input on line 514 to "and" gate 516. The other input to "and" gate 516 is line 518 from "or" gate 520 so that upon the appearance of a signal on lines 514 and 518 and gate 516 will be operative to produce an output signal on line 522 to start pulse generator 524.

It will be evident from FIG. 4b that the "or" gate 520 will receive an input on one of its input lines 528 or 529 depending upon whether or not relay contact 530 or 531 is closed. As will be evident from the FIG. 4b, the contact 530 is closed when relay actuator L of the master controller is energized whereas the relay contact 531 is closed whenever the relay actuator R is energized. In either case, that is, whenever relay contact 530 or 531 is closed, there is a connection made between ground and one of the input lines 528 or 529 of "or" gate 520. Therefore, when the master controller is calling for an increase or a decrease in generation, there is a signal on line 518, and whenever the counter $C_1$ ha scounted up to $T_1$, there is a signal on line 514 and at that time the start pulse generator 524 produces a start pulse on its output line 536 to cause energization of relay actuator 538.

The energization of relay actuator 538 serves to start the sequencing cycle, for relay 538 is a latching type relay having a latching cam 539 which will hold the associated contacts 540 and 541 closed as long as the latch 542 has not been reset by its resetting actuator 544. Upon closure of relay contact 541, the pulse generator 550 begins to initiate pulses on its output line 552. These pulses are produced at a frequency such that the space between the pulses is long enough to permit a maximum closure time for any one of the relay actuators $F_1$, $F_2$, and $F_3$ in FIG. 2.

As shown in FIG. 4b, the pulse is produced by pulse generator 550 which is connected by closed relay contact 540 to operate stepping motor 554 to rotate the movable contact 556 of sequencing switch 560 across each of its three segments sequentially. As shown, each of the segments is connected to a separate line $S_1$, $S_2$, or $S_3$ and the rotating contact 556 is connected to ground so that it sequentially produces a ground connection to the lines $S_1$, $S_2$, and $S_3$. Such a ground connection is utilized to provide the start signal for the pulse generators such as 250 of unit 232 in FIG. 2 when the segment $S_1$ is in contact with the rotating contact 556. The similar pulse generators in the pulse unit 233 and 234 in FIG. 2 are started when the ground connection is made to the other segments. The stepping of the stepping motor 554 to sequentially generate the starting signals for the pulse generators of units 232, 233, and 234 of FIG. 2 is continued until the stop pulse generator 564 produces a stop pulse on its output line 566 to energize the latch reset actuator 544 which will serve to unlatch relay 538 and allow the contacts 540 and 541 to return to their open position. The stop pulse generator also has its output line 566 connected to a single-shot circuit 570 which will produce in response to each stop pulse a delayed pulse on the synchronizing line $S_t$. The synchronizing pulse $S_t$ is utilized as a signal for initiating the start-up of pulse generators in the units 24, 42, and 40 of FIG. 1 which provide for the generation of the output pulses to the governors of the several units of area A. There is thereby synchronized the production of the output pulses to the governor motors so that the control action of several units of area A may be taken simultaneously.

The step pulse generator 564 produces the stop pulse upon the occurrence of an input signal on its input line 574 from the "or" gate 576.. The "or" gate 576 will produce an output on line 574 when there is an input on either of its input lines 578 or 579. As shown in FIG. 4b, an input will occur on line 578 whenever the "nor" gate 580 does not receive a signal on either of its input lines 582 or 583. This will occur when there is neither an energization of the relay actuator R or the relay actuator L of the master controller 400 in FIG. 4a and hence there is no closure of either of the contacts 530 or 531 to connect battery 532 to one of lines 582 and 583. Thus the stepping motor 554 will be stopped when the master controller 400 ceases to call for further change of generation in the area. The other condition under which the stepping motor will be stopped is the situation when a signal appears on line 579, namely, when the counter $C_2$ has counted up to a value greater than $T_2$.

As shown in FIG. 4b, the counter $C_2$ has as an input the pulses which appear on line 590 which are the pulses derived from pulse generator 550 upon closure of relay contact 540. When these pulses have been counted by counter $C_2$ until the count becomes greater than $T_2$, then the comparator 592 which receives count over its input count 593 will produce an output on line 579 which by way of "or" gate 576 will initiate a stop pulse to stop the stepping motor. The counter $C_2$ will be reset upon energization of relay actuator 508 to close relay contact 507. In the arrangement shown in FIG. 4b there are three segments for the stepping motor to scan with the movable contact 556 each corresponding to one of the three units involved in area A. The quantity $T_2$ will then be equal to 2 and whenever the counter $C_2$ counts more than 2 pulses, the stepping motor will be stopped as a result of the initiation of a stop pulse. It will thus be evident that stepping motor 554 causes the sequential production of start pulses for the pulse generators of units 232, 233, and 234 until either all of the pulse generators have been started or until there is no longer a requirement for a change in generation as indicated by the master controller 400 causing either the R or L relay actuators to be deenergized.

It will be evident by an examination of FIG. 4a that the production of pulses in the feedback circuit 424 of master controller 400 may cause the relay actuator R and L to be deenergized before a stop pulse is produced by stop pulse generator 564 to produce the synchronizing pulse $S_t$ for the output pulse generators such as pulse generator 30. Since it is desirable that any pulses generated by pulse generator 30 be sent to the appropriate governor motor regardless of the speed with which the master controller rebalances in response to feedback pulses, the relay contacts 26 and 28 which provide the sense of operation of the governor 18, for example, are operated by the relay actuators $R_H$ and $L_H$, and it is necessary that these relay actuators be incorporated in latching type relays so that the appropriate contacts 26 or 28 will be kept closed until a start pulse is generated for the next cycle. For this purpose the relay actuator $L_H$ is energized upon closure of contact 594 by the energization of relay actuator L providing that relay contact 595 is still closed as a result of relay actuator $R_H$ being in a deenergized state. Relay $L_H$ will then be latched into its energized position by the latching mechanism 596 and at the same time the relay contact 597 will be opened thus preventing an energization of relay actuator $R_H$. The current for actuating relay actuator $L_H$ is supplied from battery 598 through the closed relay contact 594 and closed relay contact 595 to ground.

Similarly, if the energization of relay actuator R in the master controller 400 occurs, there will be a closure of contact 599 to cause a consequent energization of relay operator $R_H$ which will cause latching up of that relay by a virtue of the operation of the latch mechanism 541. Coincidentally, there will be a disconnection of contact 595 to prevent an energization of relay actuator $L_H$. It will thus be evident that when actuator $R_H$ is energized and latched in, actuator $L_H$ cannot be energized until $R_H$ is unlatched as by the production of a start pulse which will cause a resetting of both latching mechanisms 541 and 596 as a result of the mechanical coupling 543 between relay actuator 538 and the latching mechanisms 541 and 596.

The above description sets forth the manner in which the various elements of the system interact to produce the desired operation. For clarification of the method by which the system is effective to control the area A, the following summary of the various modes of operation of the system is provided.

SUMMARY OF OPERATION

If for purposes of illustration it be assumed that area A is not carrying its own load and that there is, therefore, produced an area control error signal ACE and if it further be assumed that this signal ACE is of sufficient magnitude for a sufficient period of time to cause the EACC to close relay contact 66 and thereby produce a first adaptive signal $K_1$ and a second adaptive signal $K_2$, and if it should further be assumed that the value of $K_2$ is greater than $A'$ so that relay A is energized, it will then be evident that the area control error signal will be connected to the multiplier 406 where it will be multiplied by the second adaptive signal $K_2$ to provide an input to the master controller 400 so as to produce a signal on the output of amplifier 416 which signal will be effective to energize the appropriate relay R or L.

For the purposes of this illustration, let it be assumed that there is a need for increase of generation in area A and that, therefore, the relay R is energized. Upon the energization of relay R the contact 440 will be closed to provide feedback pulses tending to put a negative charge on capacitor 428 whenever one of the F relays and one of the R' relays is closed. Since the F relays and the R' relays are closed only when there is a unit requirement for one or more of the generators in area A to increase its generation and when that requirement is beyond the dead-band, then it will be evident that it is necessary for there to be a unit requirement signal as, for example, on line 207 exceeding the value set in the dead-band circuit 240 so that the $R_1'$ relay will be energized.

With the energization of the $R_1'$ relay and with the energization of the $F_1$ relay after the receipt of a start signal $S_1$ from the actuation of stepping motor 554, then there will be produced in the feedback circuit of the master controller 400 pulses of duration proportional to a factor of $\gamma_1$ times the unit requirement $\Delta Pd1$ so that the master controller tends to rebalance in proportion to the megawatt equivalent pulses generated to energize relay $F_1$. Likewise, relay $F_1$ is effective to close contact 32 and thus produce from pulse generator 30 a pulse which will be utilized for moving the governor motor of governor 18. That pulse will be generated, however, only upon the production of the synchronizing signal $S_t$ whenever the stop pulse generator 564 has previously initiated the single shot 570.

The pulses to the governor motor of governor 18 will be allowed to go to the raise winding of the governor motor if the relay 26 is closed by the energization of relay $R_H$ which will normally occur in response to the energization of relay R.

The master controller 400 continues to provide for the energization of relay R until the output of amplifier 416 has been reduced to approximately zero indicating that sufficient output pulses have been sent to the governor motor of governor 18 to reduce the area control error to zero thus indicating that sufficient change in generation has been called for during the present control interval to eveytually cause area A to take up its own load.

The rate at which the generation is changed on the individual generators of the area is determined by the magnitude of the pulses generated by pulse generator 250 which is in turn proportional to the unit requirement signal calculated for unit $G_1$. This and the other unit requirement signals are computed in accordance with the economic dispatch computation of the individual values for $Pd1$, $Pd2$, and $Pd3$, the individual values of the actual generation of each of the generators and the preset percentage of the total change in the desired value for the generator of the area assigned to each of the generators since the last economic dispatch computation as derived from the amplifier 212 and from the several potentiometers 216, 217, and 218.

It will be evident that as the area control error increases in magnitude and persists for longer periods, the function of the EACC is to increase the value of the first and second adaptive signals. As the second adaptive signal, for example, exceeds a value $B'$, the dead-band set up by unit 240 is bypassed by closure of contact 241 which shunts the dead-band circuit 240 so that unit $G_1$, for example, can take part in the regulation of the generation even though the unit requirement signal for that unit is not outside the dead-band. Thus more units will be subject to control action to reduce the area control error as the area control error increases. When the adaptive signal $K_2$ exceeds the value $C'$, however, the contact 456 is opened and the feedforward signals are not effective as they would be otherwise to introduce added input to the master controller 400 to cause control action to be taken in anticipation of the system condition changes which are already scheduled.

The increase of the first adaptive signal $K_1$ with an increasing area control error is effective to change the magnitude of the signal on line 206 so as to increase the computed effective unit requirement values for the several units. This will have the effect of taking these values beyond their dead-bands so that more units will be called into action to respond to control pulses and it will also have the effect of increasing the duration of the pulses produced to actuate the F relays to help reduce the area control error more quickly to zero.

When the increase of the area control error is sufficient to increase $K_2$ beyond the value $B'$, the dead-band circuit is bypassed thus causing a still further increase in the number units responding to required control action.

Upon the occurrence of conditions at any one of the generators which serve to constrain the control of the generator, the apparatus illustrated in FIG. 3 is effective, for example, to provide an actuation of relay $R_1'''$ indicating, for example, that the unit $G_1$ should not have its generation increased any further. The resulting effect is to cause an opening of relay 260 which will prevent the generation of any $F_1$ pulses from unit 232 regardless of whether or not there exists a unit requirement $\Delta Pd1$ along with a coincident energization of relay R and relay $R_1'$.

As previously mentioned, the constraints may be be due to the generation reaching a limit for the particular unit or the constraints may result from generation changes at a rate exceeding that which is tolerable on a continuing basis after utilizing the stored energy in the system.

Then the area control error is of such a value that the EACC does not produce a value $K_2$ for the second adaptive signal which is in excess of the value $A'$, then the master controller 400 no longer has as one of its inputs the signal ACE. Instead, there is provided an input through relay contact 462 of a fractional portion of the error signal ACE if there is at the same time an energization of one of the R' or one of the L' relays indicating a unit requirement beyond the dead-band of one of the units. Under those conditions the master controller 400 will be effective to control the units and to tend to return them toward the economic value and reduce the unit requirement values to values within the dead-bands esablished for the particular unit.

The control signal $\epsilon_c$ as generated by the operational amplifier 415 from the signals on line 414 and line 424 is utilized as the signal which will be produced on line 206 as an input to the unit requirement computation circuit 205 whenever the sign of the signal ACE is opposite to the sense of the control action called for by the master control as indicated by the energization of the R or L relay. The use of the signal $\epsilon_c$ as an input will cause the unit requirements based upon $\epsilon_c$ to be computed and hence the pulses to the units will be generated in such a manner that they will permit changes in generation in direction to tend to return the area control error to zero without overshoot.

It will be evident to those skilled in the art that the control system described above cannot only be in the form of an analog circuit such as that disclosed but can also be in the form of a digital computer control system capable of carrying out the various steps of the novel method.

What is claimed is:

1. The method for controlling the distribution of load among a plurality of interconnected generating units in a power distribution area comprising the steps of:
    producing an area control error signal representative of the deviation of the generation of the area from that required to supply its own load at the desired frequency;
    producing signals representative of the actual generation being produced by the units of said area;
    producing signals representative of the desired generation of each of the units of said area for distribution of the load existing at the time of the calculation of said desired generation values in a predetermined manner;
    producing a control signal representative of the difference between the magnitude of said area control error signal and a feedback signal representative of the control action previously taken;
    producing a unit requirement signal representative of the change in unit generation necessary for each of the units to produce said predetermined distribution of the existing area load; computing said unit requirement signals from said area control error signal, said actual generation signals, and said desired generation signals when said area control error signal is of the same sign as said control signal, and computing said unit requirement signals from said control signal, said actual generation signals, and said desired generation signals when said area control error signal is of a sign opposite the sign of said control signal; and
    controlling said units so as to effect a change in generation corresponding with said unit requirement signals when said control signal indicates a change in load in direction corresponding with that called for by the unit requirement signals.

2. In a system for controlling the distribution of load among a plurality of interconnected generating units in a power distribution area in accordance with unit requirement signals computed from an area control error signal, signals representative of the actual generation being produced by units of said area, and signals representative of the desired generation of each of the units of said area for distributing the load existing at the time of the calculation of said desired generation values in a predetermined manner, the improvement which comprises:
    means substituting for said area control error signal in said computation a control signal of magnitude corresponding to the difference between the magnitude of said area control error signal and a feedback signal representative of the control action previously taken, said substitution being made when said control signal is of a sign different from the sign of said area control error signal.

3. A system for controlling the distribution of load among a plurality of interconnected generating units in a power distribution area comprising:
    means for producing an area control error signal representative of the deviation of the generation of the area from that required to supply its own load at the desired frequency;
    means for producing signals representative of the actual generation being produced by the units of said area;
    means for producing signals representative of the desired generation of each of the units of said area for distribution of the load existing at the time of the calculation of said desired generation values in a predetermined manner;
    means for producing a control signal representative of the difference between the magnitude of said area control error signal and a feedback signal representative of the control action previously taken;
    means for producing unit requirement signals from said area control error signal, said actual generation signals, and said desired generation signals when said area control error signal is of the same sign as said control signal; and from said control signal, said actual generation signals, and said desired generation signals when said area control error signal is of a sign opposite the sign of said control signal; and
    means for controlling said units so as to effect a change in generation in response to said unit requirement signals.

4. The method for controlling the distribution of load among a plurality of interconnected generating units in a power distribution area comprising the steps of:
    producing unit requirement signals representative of the change in unit generation necessary for the units of said area to produce a distribution of the existing area load in a predetermined manner, computing each of said unit requirement signals from said area control error signal, the associated actual generation signal, and the associated desired generation signal when the area control error is of the same sense as a control signal produced in accordance with the difference between the magnitude of the area control error signal and a feedback signal representative of the control action previously taken, and computing each of said unit requirement signals from said control signal, an associated actual generation signal, and an associated desired generation signal when the area control error signal is of a sense opposite the sense of the control signal; and
    controlling said units so as to effect a change in generation for each of the units corresponding to said unit requirement signals.

5. The method for controlling the distribution of load among a plurality of interconnected generating units in a power distribution area comprising the steps of:
    producing an area control error signal representative of the deviation of the generation of the area from that required to supply its own load at the desired frequency;
    producing an adaptive signal when said area control error signal exceeds a predetermined value for a predetermined time, and increasing said adaptive signal in magnitude as said area control error signal exceeds higher predetermined values for a predetermined time;
    producing a modified area control error signal representing the product of said area control error signal and said adaptive signal;

producing signals representative of the actual generation being produced by the units of said area;

producing signals representative of the desired generation of each of the units of said area for economically distributing the load existing at the time of the calculation of said desired generation values;

producing a control signal in accordance with the magnitude of said area control error signal and the magnitude of a signal representative of the change in generation expected to result from control action in response to the control signal;

producing a unit requirement signal representative of the change in unit generation necessary for each of the units to produce said economic distribution of the existing area load; computing said unit requirement signals from said area control error signal, said actual generation signals, and said desired generation signals when said area control error signal is of the same sense as said control signal, and computing said unit requirement signals from said control signal, said actual generation signals, and said desired generation signals when said area control error signal is of a sense opposite the sense of said control signal; and controlling said units so as to effect a change in generation at a rate corresponding with the magnitude of said unit requirement signals.

References Cited
UNITED STATES PATENTS

| | | | |
|---|---|---|---|
| 2,688,728 | 9/1954 | Carolus | 324—73 |
| 3,419,772 | 12/1968 | Ross | 318—18 |

MALCOLM A. MORRRISON, Primary Examiner

E. J. WISE, Assistant Examiner

U.S. Cl. X.R.

307—57